(12) United States Patent
Kawashima et al.

(10) Patent No.: US 8,008,886 B2
(45) Date of Patent: Aug. 30, 2011

(54) POWER CONVERTER

(75) Inventors: Reiji Kawashima, Shiga (JP); Yoshitsugu Koyama, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 1071 days.

(21) Appl. No.: 11/664,624

(22) PCT Filed: Sep. 30, 2005

(86) PCT No.: PCT/JP2005/018087
§ 371 (c)(1), (2), (4) Date: Jul. 13, 2007

(87) PCT Pub. No.: WO2006/038545
PCT Pub. Date: Apr. 13, 2006

(65) Prior Publication Data
US 2008/0284367 A1 Nov. 20, 2008

(30) Foreign Application Priority Data
Oct. 4, 2004 (JP) .................................. 2004-291316

(51) Int. Cl.
*H02P 23/00* (2006.01)
(52) U.S. Cl. .............. 318/811; 363/34; 363/37; 363/39; 363/40; 363/41; 363/44; 363/45; 363/47; 363/52; 363/55; 363/56.01; 363/56.02
(58) Field of Classification Search .................... 363/34, 363/37, 39, 40, 41, 44, 45, 47, 52, 55, 56.01, 363/56.02
See application file for complete search history.

(56) References Cited

U.S. PATENT DOCUMENTS

| | | | | |
|---|---|---|---|---|
| 3,818,128 A | * | 6/1974 | Chambers et al. ............ | 348/730 |
| 4,330,817 A | * | 5/1982 | Avar et al. ...................... | 363/96 |
| 4,563,624 A | * | 1/1986 | Yu ................................. | 318/472 |
| 5,065,302 A | * | 11/1991 | Kanazawa ...................... | 363/37 |
| 5,210,684 A | * | 5/1993 | Nam ............................... | 363/37 |
| 5,646,498 A | * | 7/1997 | Lipo et al. ..................... | 318/800 |
| 5,796,601 A | * | 8/1998 | Yamamoto ....................... | 363/84 |
| 5,835,364 A | * | 11/1998 | DeWinter et al. ............... | 363/45 |
| 5,982,253 A | * | 11/1999 | Perrin et al. .................... | 333/182 |
| 6,191,676 B1 | * | 2/2001 | Gabor ............................. | 336/160 |
| 6,208,098 B1 | * | 3/2001 | Kume et al. ............. | 318/400.25 |
| 6,366,483 B1 | * | 4/2002 | Ma et al. .......................... | 363/87 |
| 6,753,665 B2 | * | 6/2004 | Ueda et al. ..................... | 318/135 |
| 7,262,979 B2 | * | 8/2007 | Wai et al. .................... | 363/56.03 |
| 7,413,413 B2 | * | 8/2008 | Schnetzka et al. ............. | 417/53 |
| 2003/0079486 A1 | | 5/2003 | Kato et al. | |

FOREIGN PATENT DOCUMENTS

| | | |
|---|---|---|
| EP | 0 987 813 A2 | 3/2000 |
| JP | 9-294381 A | 11/1997 |
| JP | 2001-69762 A | 3/2001 |
| JP | 2001-211690 A | 8/2001 |
| JP | 2003-018853 A | 1/2003 |
| JP | 2003-143753 A | 5/2003 |
| JP | 2004-032938 A | 1/2004 |
| JP | 2004-260963 A | 9/2004 |

OTHER PUBLICATIONS

Singh, et al. "Unity Power Factor Converter-Inventer Fed Vector Controlled Cage Motor Drive Without Mechanical Speed Sensor"; Industrial Electronics, Control, and Instrumentation, 1995; Proc. of the 1995 IEEE IECON 21st International Conference on Orlando, FL; Nov. 6-10, 1995; vol. 1; pp. 609-614; XP010154744.

* cited by examiner

*Primary Examiner* — Rita Leykin
(74) *Attorney, Agent, or Firm* — Birch, Stewart, Kolasch & Birch, LLP.

(57) ABSTRACT

A power converter is provided with a rectifying circuit, an inverter circuit, and a common mode filter including a common mode choke coil and a capacitor. The switching frequency of a PWM rectifying circuit is set at three times the switching frequency of a PWM inverter. Alternatively, the resonance frequency of the common mode filter is set at twice the carrier frequency of the rectifying circuit or the PWM inverter circuit or more.

10 Claims, 20 Drawing Sheets

FIG. 2
(A)
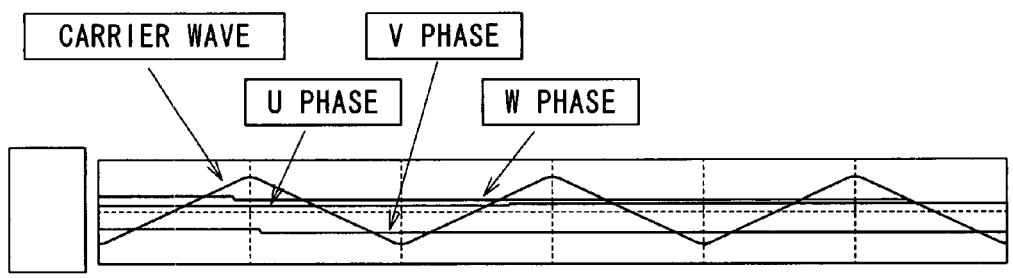
(B)
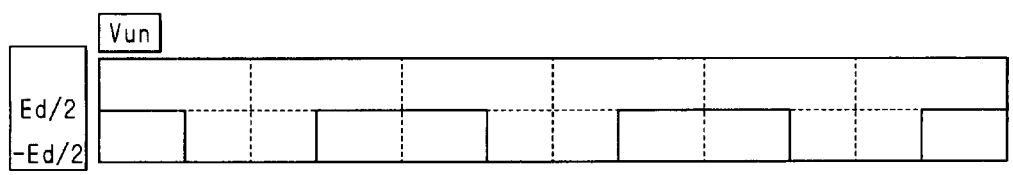
(C)
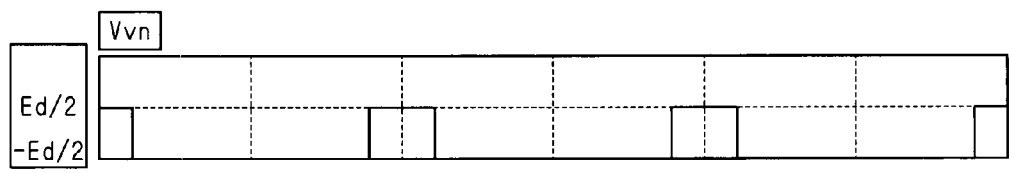
(D)
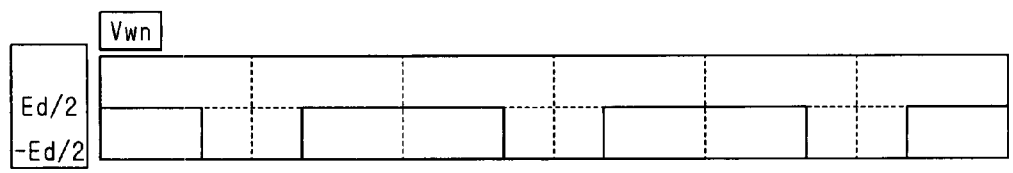
(E)
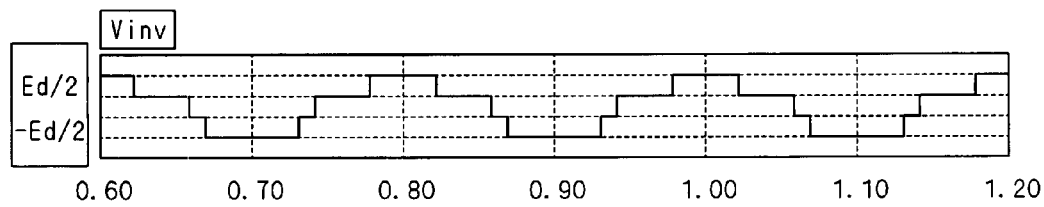

F I G . 3
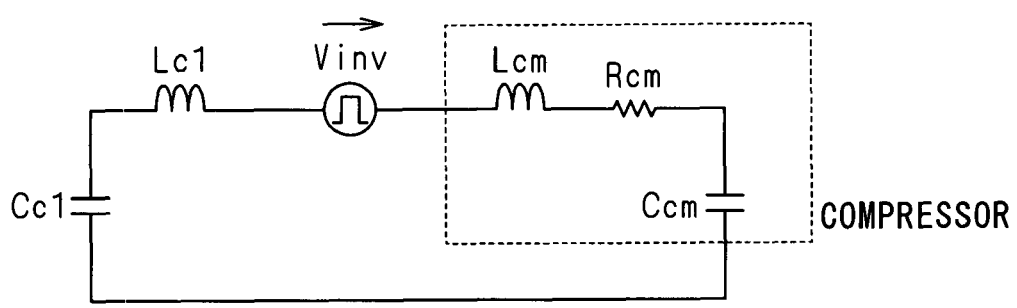

FIG. 4
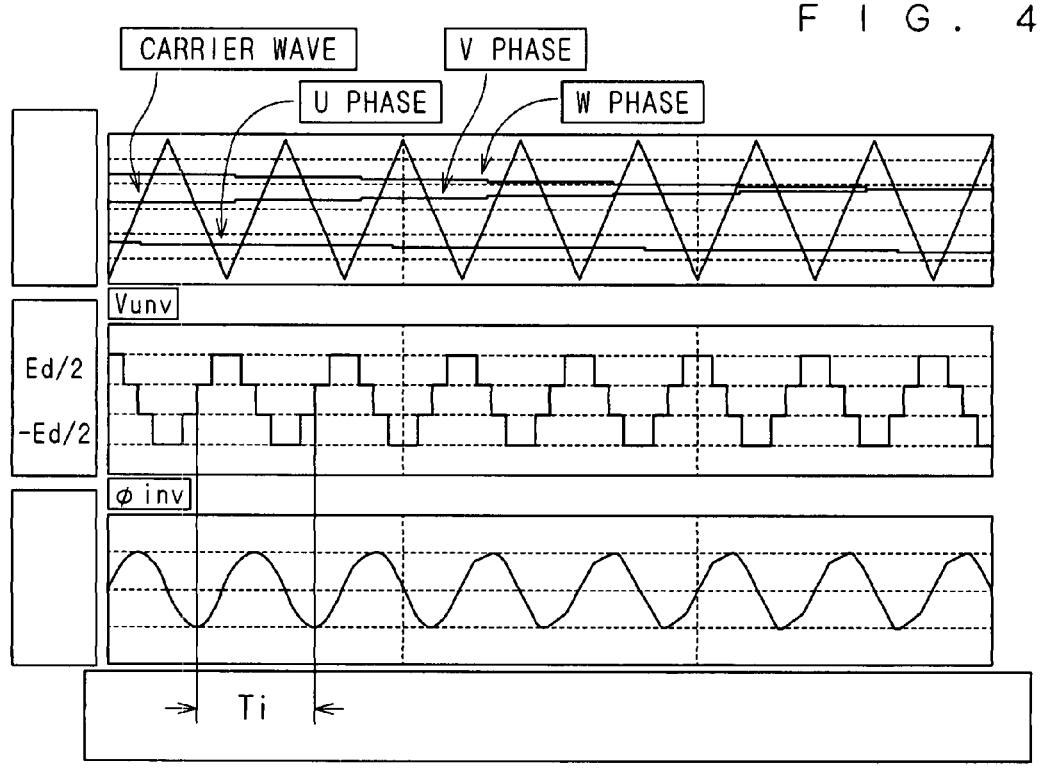
(A)
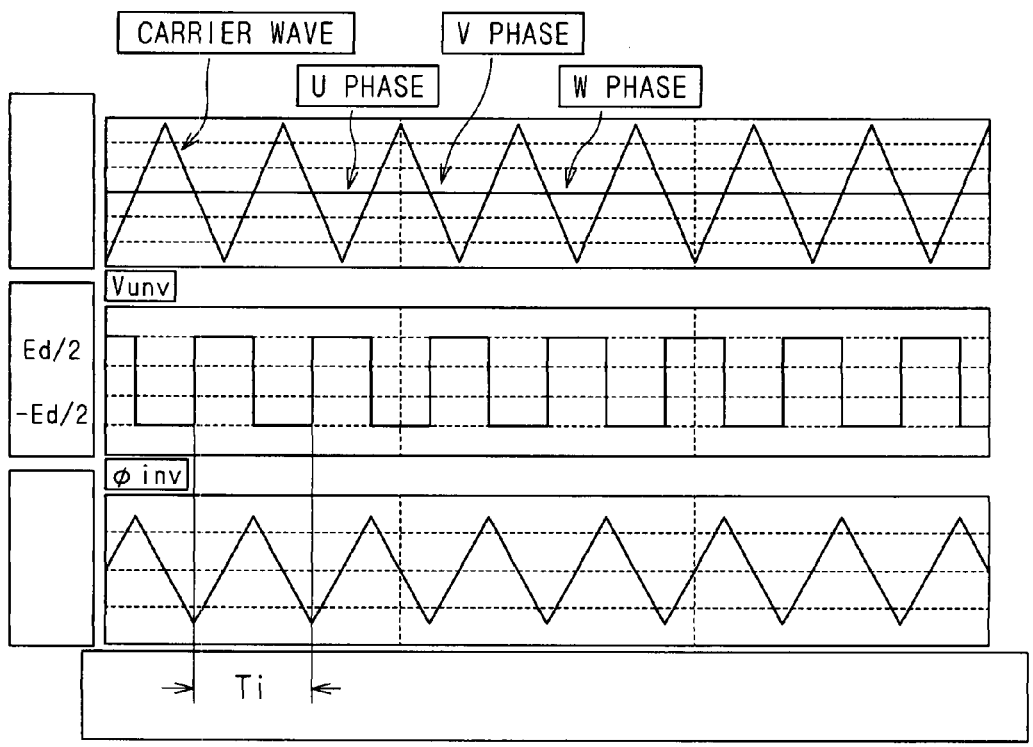
(B)

(A)
FIG. 13
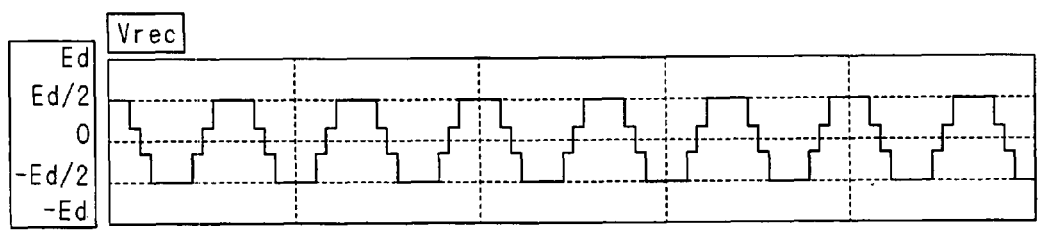
(B)
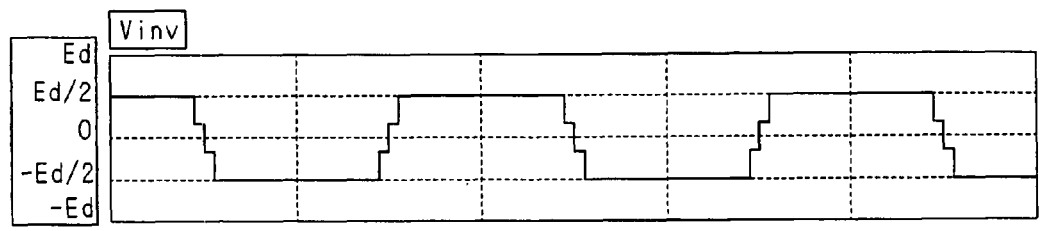
(C)
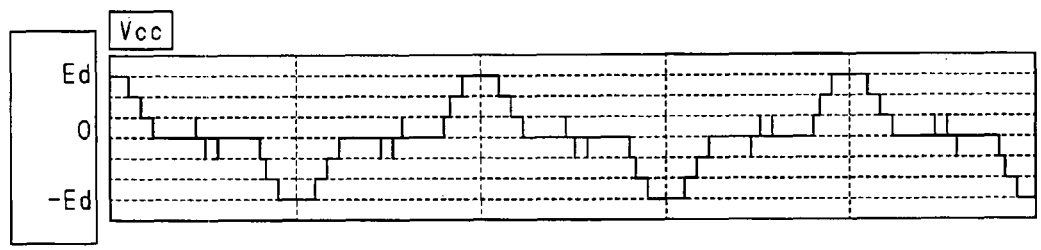
(D)
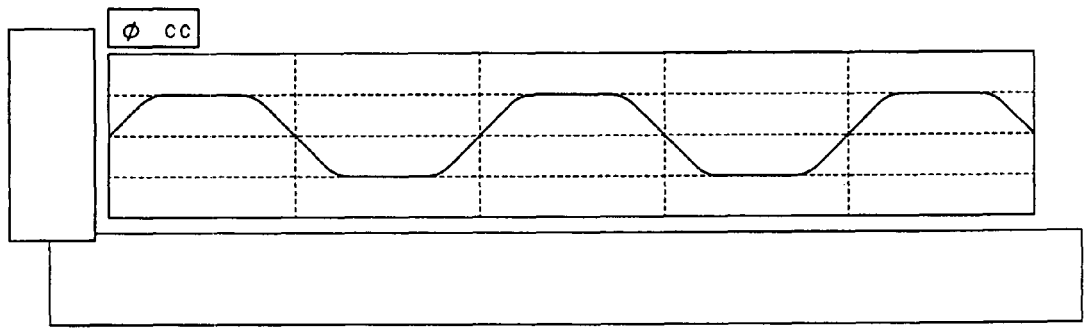

F I G. 1 4
(A)
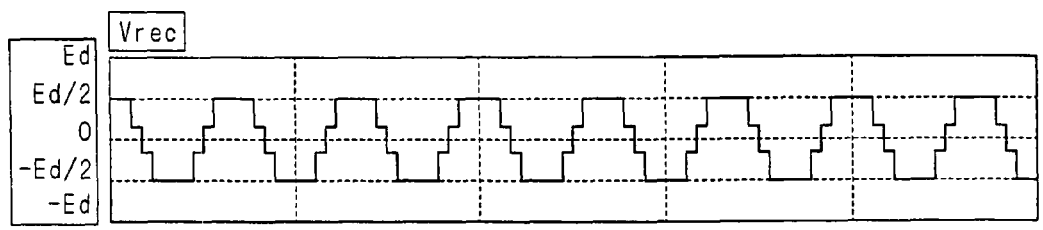
(B)
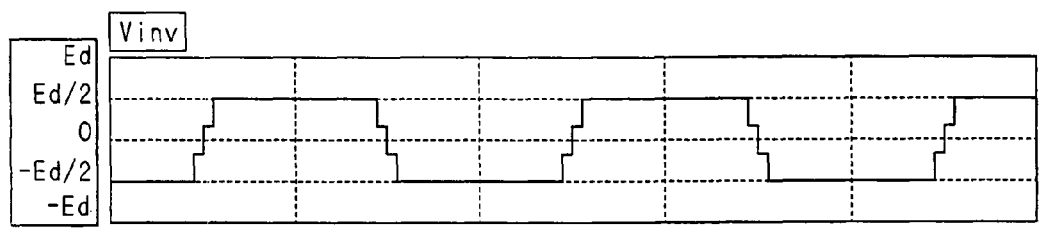
(C)
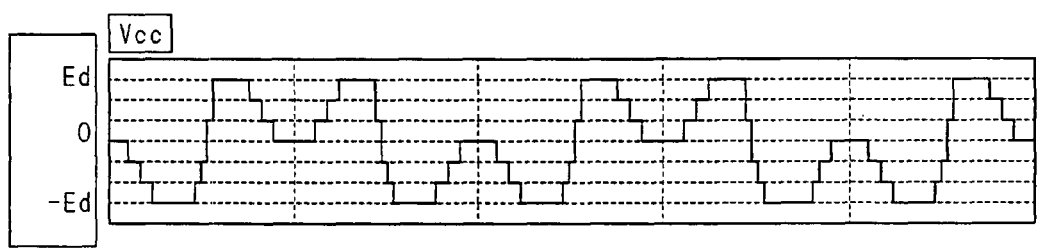
(D)
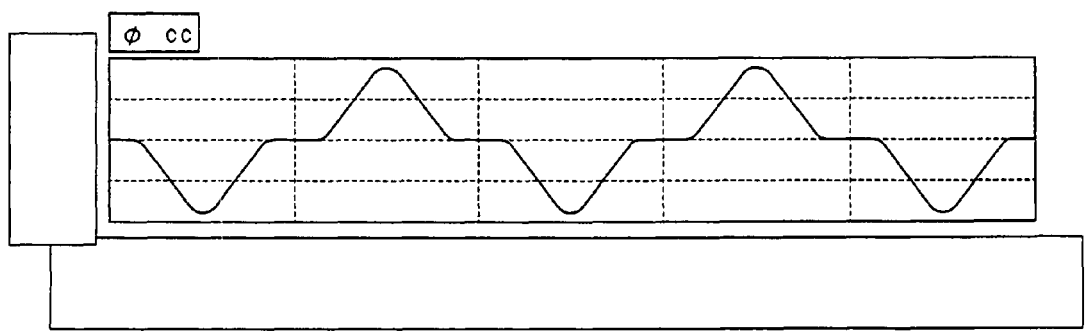

F I G. 1 5
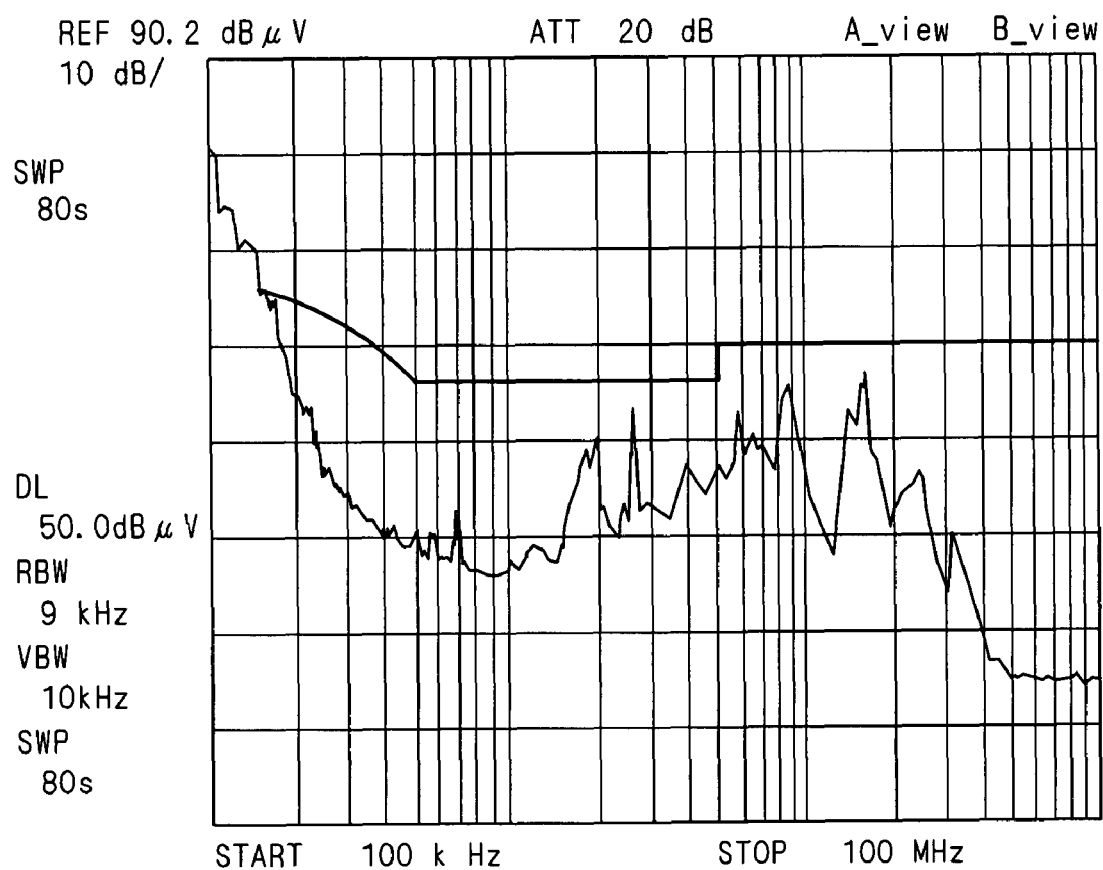

F I G. 1 6
(A)
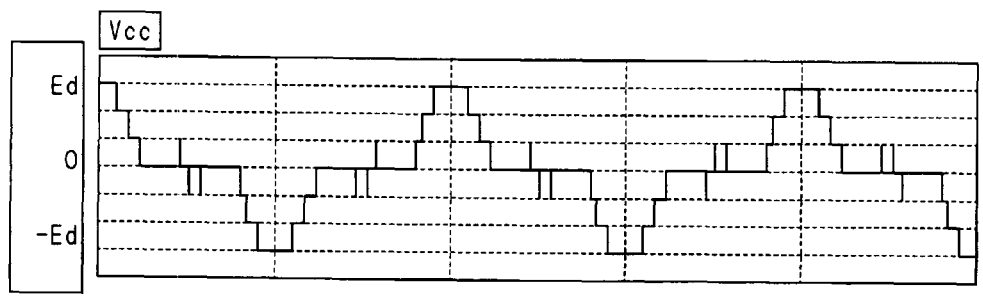
(B)
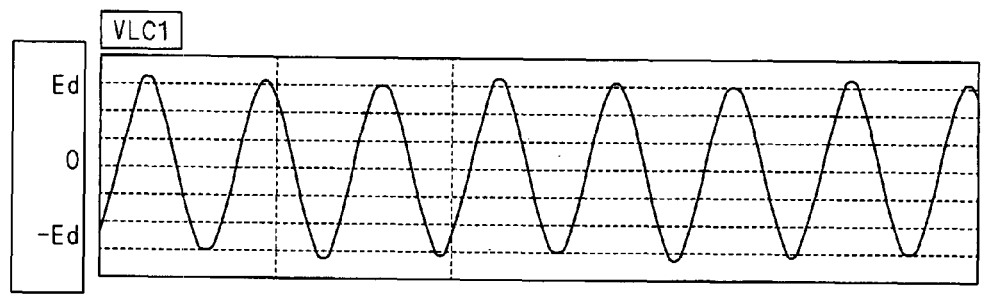
(C)
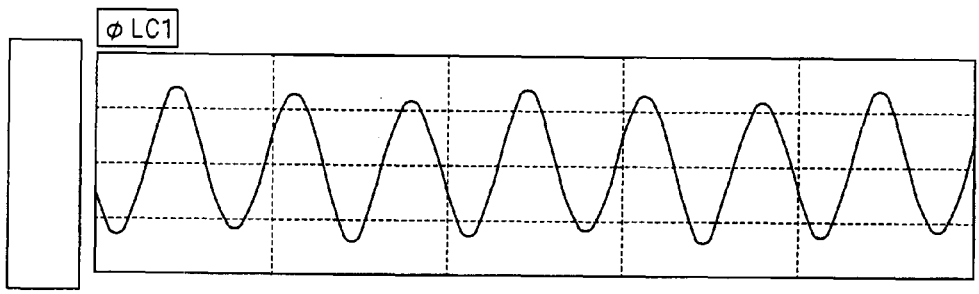

F I G. 17
(A)
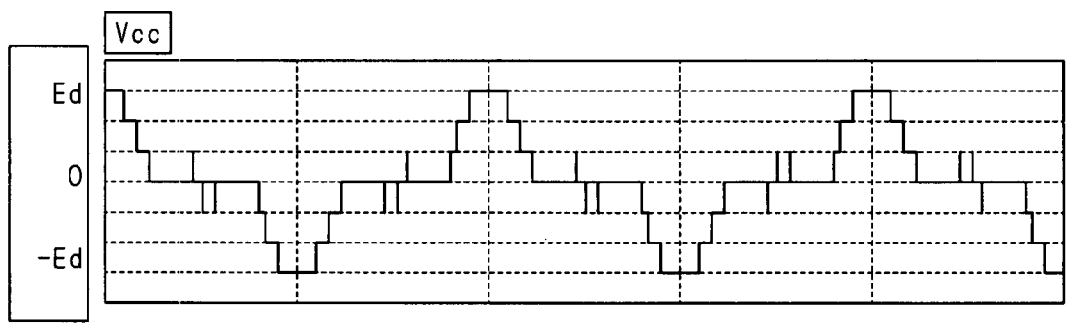
(B)
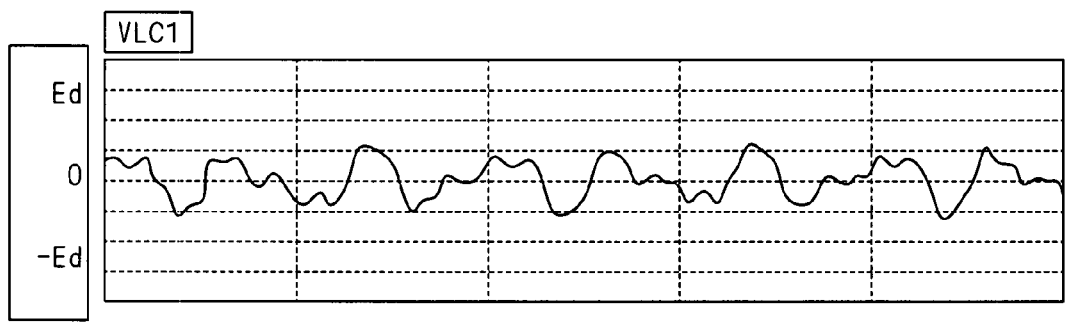
(C)
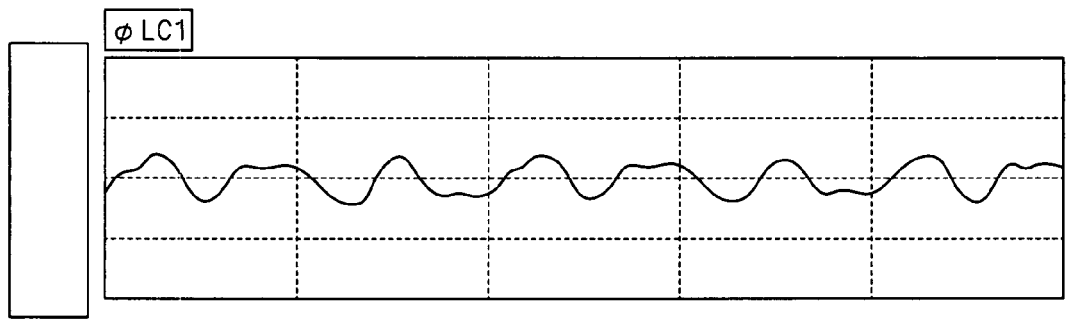

F I G . 1 8
(A)
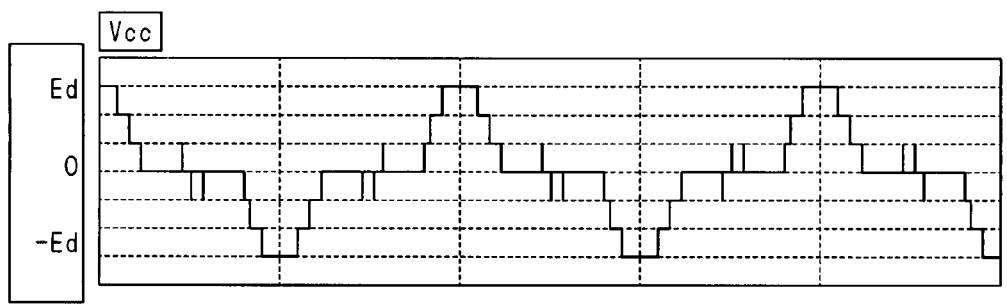
(B)
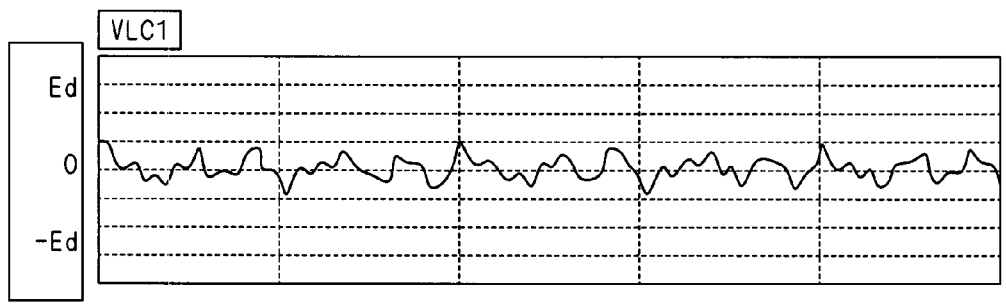
(C)
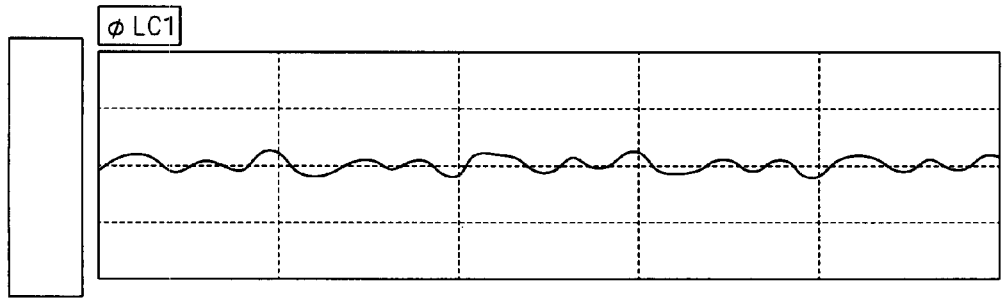

F I G. 1 9
(A)
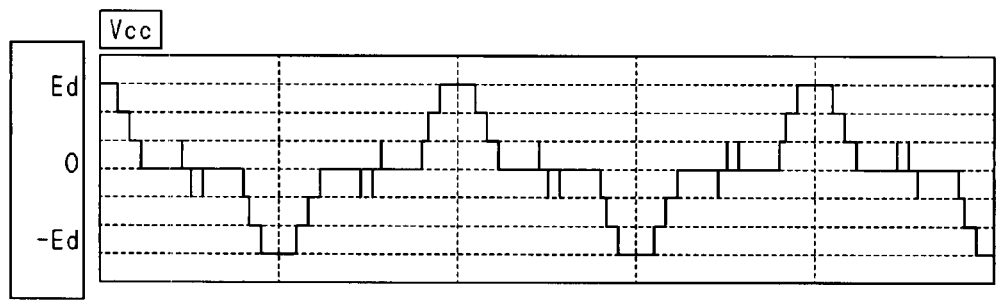
(B)
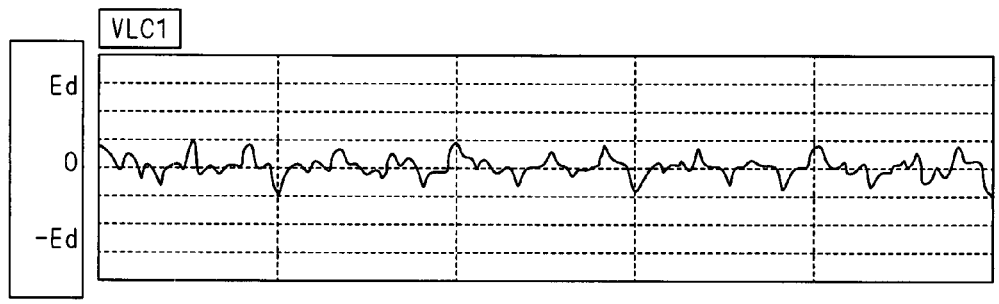
(C)
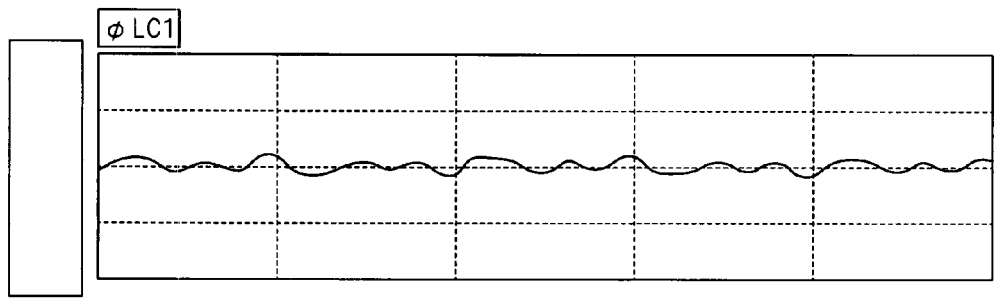

FIG. 20
(A)
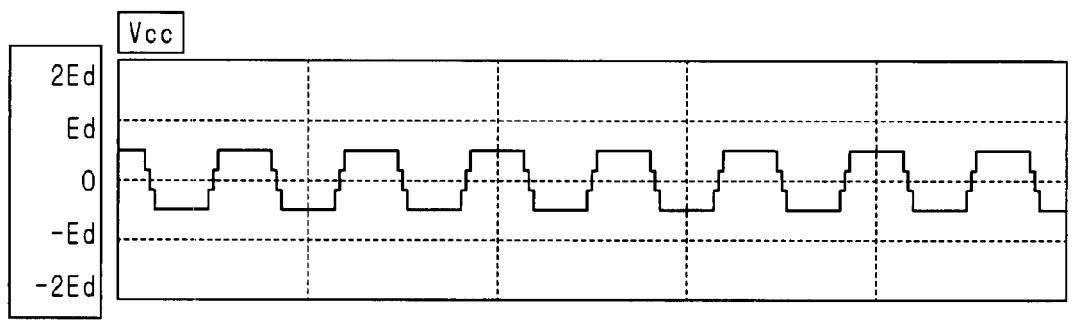
(B)
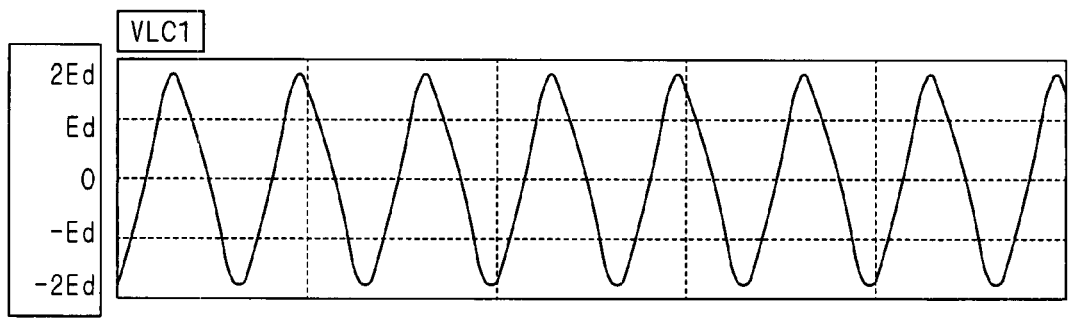
(C)
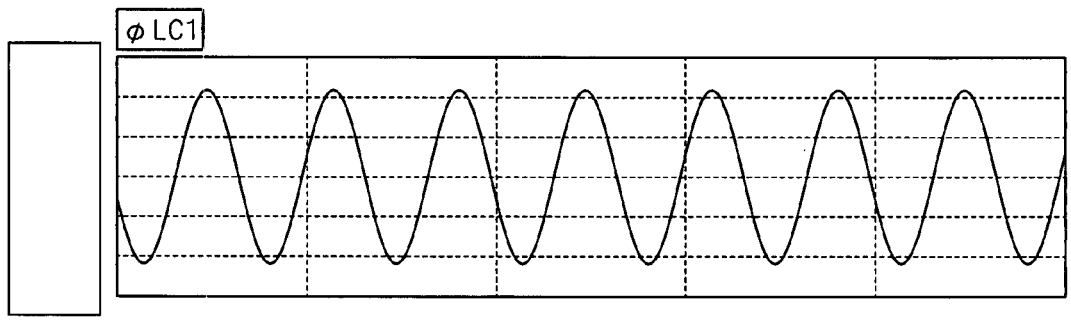

F I G. 2 1
(A)
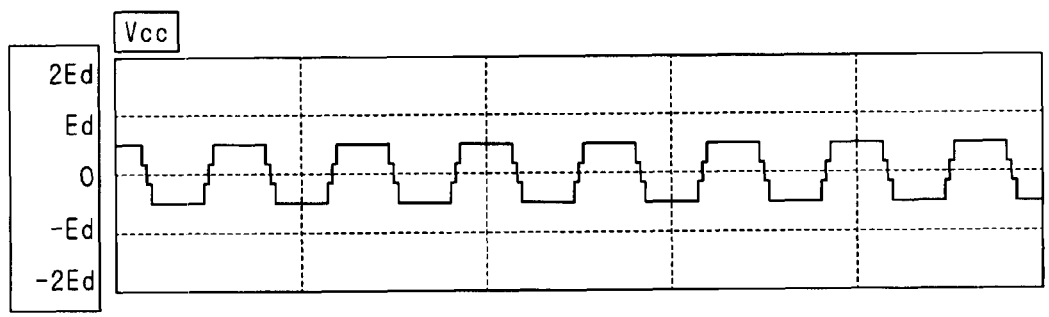
(B)
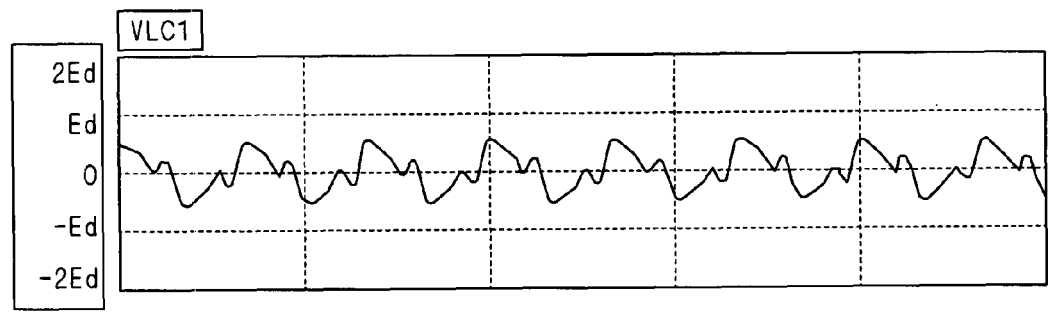
(C)
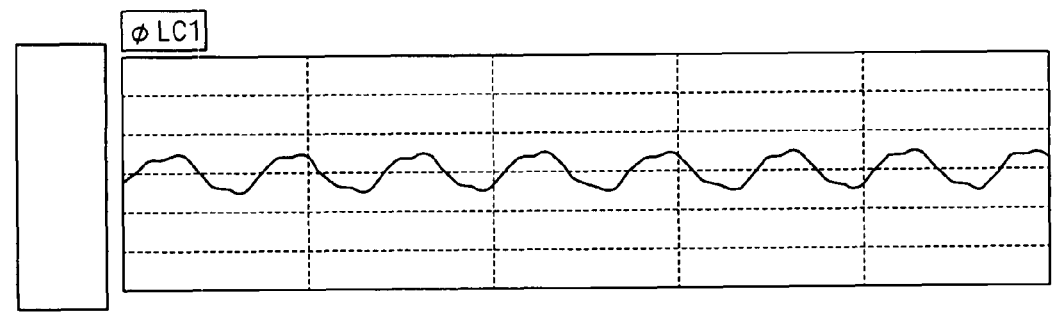

FIG. 22
(A)
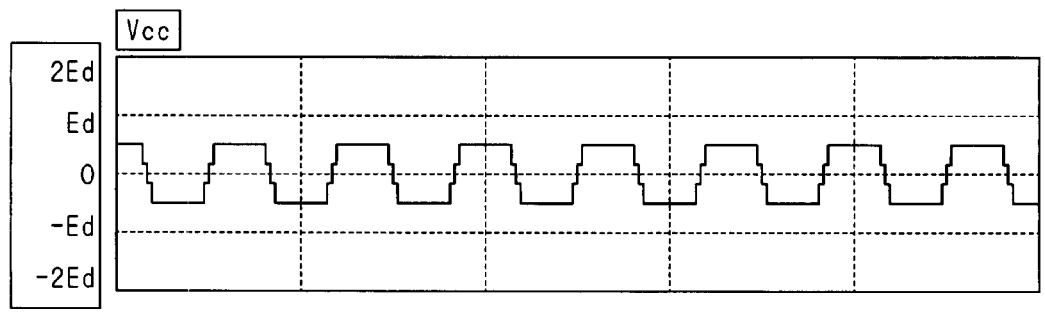
(B)
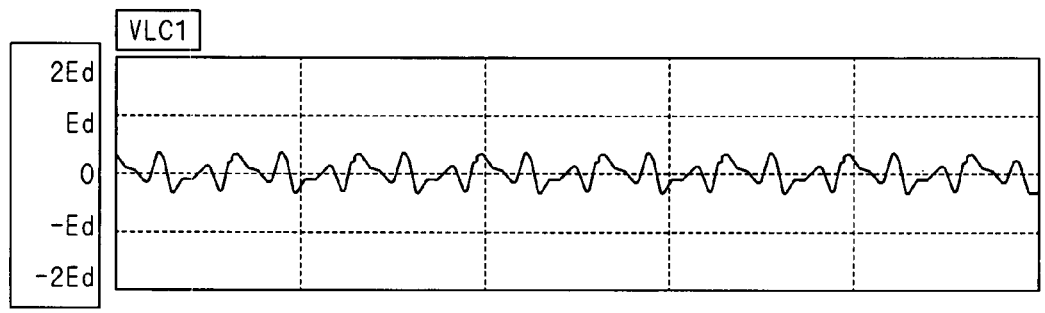
(C)
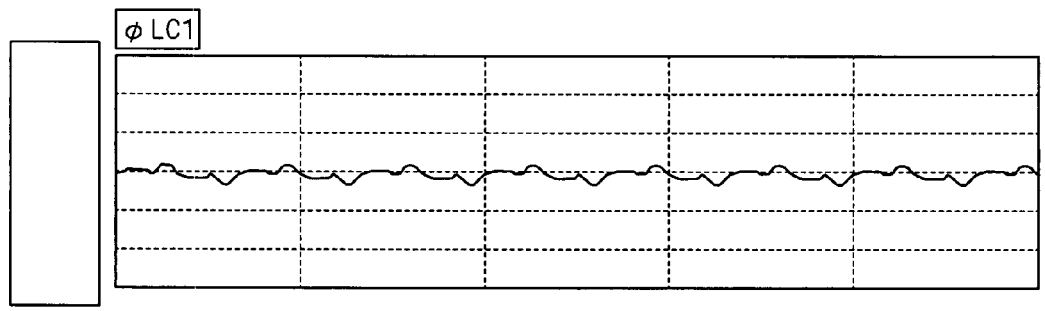

FIG. 23
(A)
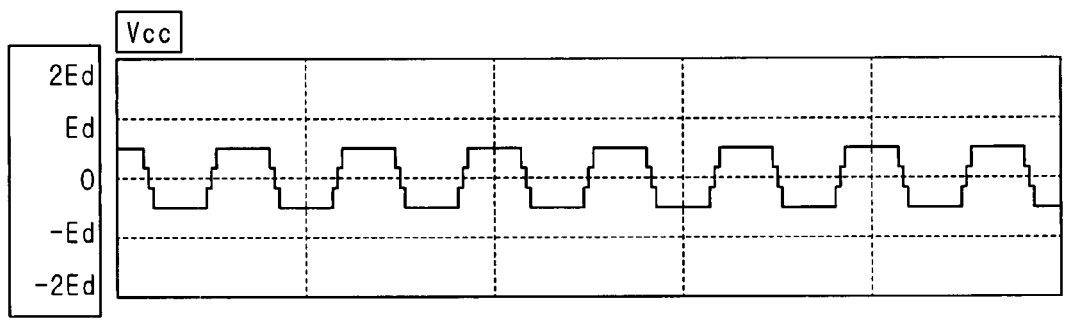
(B)
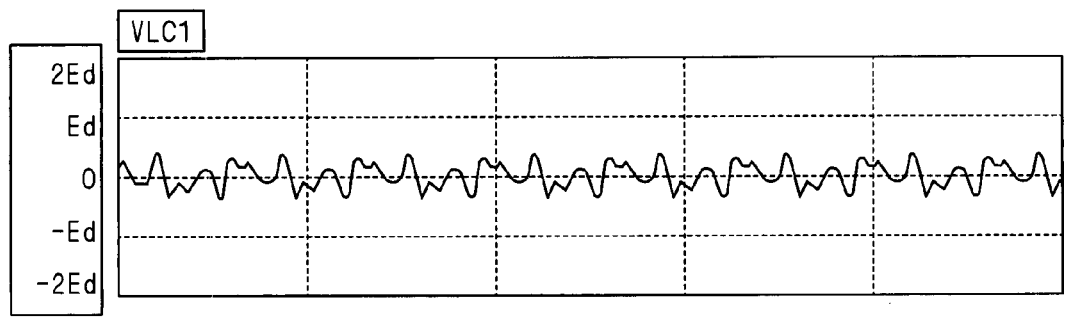
(C)
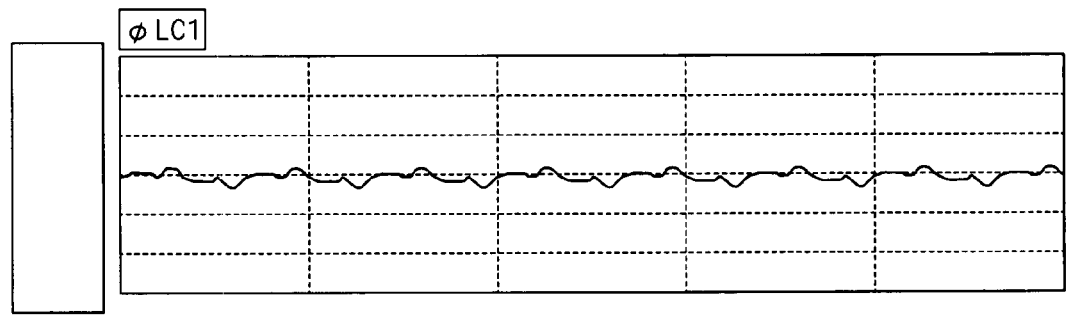

POWER CONVERTER

TECHNICAL FIELD

This invention relates to a power converter including a PWM rectifying circuit, a PWM inverter circuit, and a common mode filter including a common mode choke coil and a capacitor.

BACKGROUND ART

A power converter including a PWM rectifying circuit, a PWM inverter circuit, and a common mode filter including a common mode choke coil and a capacitor has conventionally been presented (cf. Patent document 1).

FIG. 1 is an electric circuit diagram showing a motor driving system for driving a motor via a power converter formed by a diode rectifying circuit and a PWM inverter circuit.

This motor driving system rectifies a three-phase ac voltage to a dc voltage in the diode rectifying circuit, and carries out pulse width modulation by switching devices of the PWM inverter circuit by comparing a triangular wave signal which is a carrier wave and a modulation wave, to thereby output an ac voltage of a desired voltage and frequency and supply it to the motor. Then, when the respective switching devices of the PWM inverter circuit operate, a common mode voltage Vinv {cf. (E) in FIG. 2} is generated as shown in FIG. 2. Defining potentials between output terminals U, V, W of the PWM inverter circuit and a middle point N of a dc part as Vun, Vvn and Vwn, the common mode voltage Vinv is expressed as:

$$Vinv = (Vun + Vvn + Vwn)/3$$

which takes four values of Ed/2, Ed/6, −Ed/6 and −Ed/2, and presents a step-like waveform having a carrier frequency of the PWM inverter as the fundamental component.

This common mode voltage Vinv results in harmonic leakage current and a shaft voltage when driving a motor by an inverter. The harmonic leakage current results in a conduction noise, which mainly causes a noise terminal voltage. Therefore, various countermeasures are studied to solve problems resulting from this common mode voltage Vinv.

Of these countermeasures, a method of reducing harmonic leakage current using a common mode filter formed by combination of a common mode choke coil and a capacitor is generally used. An equivalent circuit to the common mode of a motor driving system using a common mode filter is as shown in FIG. 3. A common mode choke coil for use in the common mode filter has a magnetic material core with three-phase windings wound therearound such that they are equal in polarity and number of turns, and has an inductance of zero for a normal mode since magnetomotive forces caused by three-phase currents are canceled out, while operating as a great reactor against the common mode. However, when the magnetic flux density of the common mode choke coil exceeds a saturation magnetic flux density Bmax, the inductance is reduced drastically, so that it no longer serves as a common mode filter.

Herein, defining a voltage applied to the common mode choke coil as VLC1 and the number of turns of the common mode choke coil is N, a magnetic flux $\phi LC1$ of the core is expressed by Equation 1, and defining the effective cross section of the magnetic material core as S, a magnetic flux density BLC1 is expressed by Equation 2.

$$\phi LC1 = \frac{1}{N} \cdot \int VLC1 dt \quad \text{[Equation 1]}$$

$$BLC1 = \frac{\Phi LC1}{S} = \frac{1}{SN} \cdot \int VLC1 dt \quad \text{[Equation 2]}$$

And, the absolute value of the common mode voltage rises to maximum in the case where all of three-phase arms of the inverter are turned on at the positive side or negative side (where the inverter has a modulation factor of zero). Herein, a flux linkage $\phi inv$ is expressed by Equation 3 defining a carrier period of the inverter as Ti and in the case where the common mode voltage Vin is applied as a whole to the common mode choke coil, which increases when a dc voltage Ed is high or the switching period is long, so that the common mode choke coil is more likely to bring about magnetic saturation.

$$\phi inv = \frac{1}{N} \cdot \int Vinv dt = \frac{Ed \cdot Ti}{8 \cdot N} \quad \text{[Equation 3]}$$

And, in order to reduce the magnetic flux density such that the common mode choke coil does not saturate, the cross section S of the coil needs to be increased or the number of turns N needs to be increased. That is, in either case, the core is increased in size. FIG. 4 shows a carrier wave, each phase voltage, a common mode voltage Vinv and a flux linkage $\phi inv$ {cf. (A) in FIG. 4} of the common mode choke coil when a modulation factor Ki of the inverter is 1, and a carrier wave, each phase voltage, a common mode voltage Vinv and a flux linkage $\phi inv$ {cf. (B) in FIG. 4} of the common mode choke coil when the modulation factor is 0.

Further, to comply with harmonic current regulations, a PWM rectifying circuit (cf. FIG. 5) having switching devices provided in parallel with a diode is used in some cases. In this case, the switching devices of the PWM rectifying circuit also carry out the operation similar to the PWM inverter circuit, which causes a common mode voltage Vrec to be generated from the PWM rectifying circuit.

An equivalent circuit to the common mode of the PWM rectifying circuit and PWM inverter circuit is as shown in FIG. 6, where the common mode voltages Vrec and Vinv generated by the PWM rectifying circuit and PWM inverter circuit for the dc link are in reverse series.

And, in the case where the carrier wave of the PWM rectifying circuit and PWM inverter circuit is made common (in the case where the switching frequency is made equal to each other), the common mode voltages of the PWM rectifying circuit and PWM inverter circuit cancel each other as shown in FIG. 7, causing a common mode voltage Vcc as a whole to be smaller than the common mode voltages generated by the respective PWM rectifying circuit and PWM inverter circuit.

Patent document 1: Japanese Patent Application Laid-Open No. 2003-18853

DISCLOSURE OF INVENTION

Problems to be Solved by the Invention

However, in the case where the switching frequency of the PWM rectifying circuit and the switching frequency of the PWM inverter circuit need to be set at different frequencies, the common mode voltages generated by the respective PWM rectifying circuit and PWM inverter circuit are amplified or cancel each other. Specifically, the common mode voltage in the case where the switching frequency of the PWM rectifying circuit is twice the switching frequency of the PWM inverter circuit is as shown in FIG. 8, and the common mode voltage in the case where the switching frequency of the PWM rectifying circuit is 2.4 times the switching frequency of the PWM inverter circuit is as shown in FIG. 9.

In this manner, there are cases in which the use of the PWM rectifying circuit causes an increase in common mode voltage depending on the relationship between the switching frequencies of the PWM rectifying circuit and PWM inverter circuit, and as a result, the use of an equivalent to a common mode choke coil that has been used in the diode rectifying circuit causes magnetic saturation. Thus, the function as a filter is lost, and the effect of suppressing a conduction noise such as a noise terminal voltage is lost (cf. FIG. 10 showing a noise terminal voltage in the case where the PWM rectifying circuit and PWM inverter circuit are equal in switching frequency, and FIG. 11 showing a noise terminal voltage in the case where the switching frequency of the PWM rectifying circuit is twice the switching frequency of the PWM inverter circuit).

Particularly, in the motor driving system including the PWM rectifying circuit and PWM inverter circuit, the switching frequency of the PWM rectifying circuit is set at a high frequency so as not to cause noise, for example, while setting the switching frequency of the PWM inverter circuit at a low frequency so as to reduce switching losses. Accordingly, setting the switching frequency of the PWM rectifying circuit and the switching frequency of the PWM inverter circuit at different frequencies as described above is not special by no means, which in result generally causes the occurrence of the aforementioned inconveniences.

This invention has been made in view of the aforementioned problems, and has an object to provide a power converter capable of preventing a common mode voltage from being increased to a degree that brings a common mode choke coil into magnetic saturation.

Means to Solve the Problems

According to a first aspect of the present invention, a power converter comprises: a common mode filter including a common mode choke coil and a capacitor: a PWM rectifying circuit having its input connected to the common mode filter, and operating at a first carrier frequency where the common mode choke coil does not bring about magnetic saturation: and a PWM inverter circuit having its input connected to an output of the PWM rectifying circuit at a second carrier frequency where the common mode choke coil does not bring about magnetic saturation.

According to a second aspect of the invention, in the power converter according to the first aspect, the first carrier frequency is set at an odd-multiple of the carrier frequency.

According to a third aspect of the invention, a power converter comprises: a common mode filter including a common mode choke coil and a capacitor; a rectifying circuit having its input connected to the common mode filter; and a PWM inverter circuit having its input connected to an output of the rectifying circuit, and operating at a carrier frequency of not more than half of a resonance frequency of the common mode filter.

According to a fourth aspect of the invention, a power converter comprises: a common mode filter including a common mode choke coil and a capacitor; a rectifying circuit having its input connected to the common mode filter, and operating at a carrier frequency of not more than half of a resonance frequency of the common mode filter; and a PWM inverter circuit having its input connected to an output of the rectifying circuit.

According to a fifth aspect of the invention, in the power converter according to any one of the first to fourth aspects, the PWM inverter circuit supplies a driving power to a compressor driving motor.

Effects of the Invention

The power converters according to the first to fifth aspects produce the distinctive effects of preventing magnetic saturation of the common mode choke coil of the common mode filter which in turn can achieve size reduction of the common mode choke coil.

BEST MODE FOR CARRYING OUT THE INVENTION

Hereinafter, an embodiment of this invention will be described in detail with reference to the accompanying drawings.

FIG. 12 is a schematic diagram showing the configuration of a compressor-driving-motor driving system into which an embodiment of a power converter of this invention is incorporated.

This compressor-driving-motor driving system includes a PWM rectifying circuit 2 having each input terminal connected to each phase output terminal of a Y-connected three-phase alternating current power supply 1 via a common mode choke coil Lc1 and a reactor Ln in series, a pair of capacitors 3 having capacities equal to each other connected in series between output terminals of the PWM rectifying circuit 2, a PWM inverter 4 having an input terminal to which a voltage between terminals of the series connection circuit of the pair of capacitors 3 is applied, and a compressor driving motor 5 to which the output of the PWM inverter 4 is supplied. And, it includes a capacitor Cc1 connected between the node between a common mode choke coil Lc1 and reactor Ln of each phase and the neutral point of the three-phase alternating current power supply 1. It further includes a PWM rectifying circuit control part 6 for controlling each switching device of the PWM rectifying circuit 2 and a PWM inverter control part 7 for controlling each switching device of the PWM inverter 4.

And, the PWM rectifying circuit control part 6 sets the switching frequency of the PWM rectifying circuit 2 three times the switching frequency of the PWM inverter 4 by the PWM inverter control part 7. And, the PWM rectifying circuit control part 6 and PWM inverter control part 7 set the common mode voltage Vrec generated by the PWM rectifying circuit 2 and the common mode voltage Vinv generated by the PWM inverter 4 at the same phase.

Other processing of the both control parts 6 and 7 is conventionally known, and detailed explanation will be omitted. Further, the common mode choke coil Lc1 and capacitor Cc1 constitute a common mode filter.

The operation of the compressor-driving-motor driving system of the aforementioned configuration will be described below.

A three-phase ac voltage is converted into a dc voltage by controlling the switching devices of the PWM rectifying circuit 2 by the PWM rectifying circuit control part 6, and smooth it by the capacitor 3. Then, the dc voltage is converted into three-phase ac voltage by controlling the switching devices of the PWM inverter 4 by the PWM inverter control part 7, and applies it to the compressor driving motor 5.

Then, a common mode voltage Vcc as a whole becomes as shown in (C) in FIG. 13, and a magnetic flux $\phi$cc of the common mode choke coil Lc1 becomes as shown in (D) in FIG. 13 because the switching frequency of the PWM rectifying circuit 2 by the PWM rectifying circuit control part 6 is set at three times the switching frequency of the PWM inverter 4 by the PWM inverter control part 7, and the common mode voltage Vrec generated by the PWM rectifying circuit 2 and the common mode voltage Vinv generated by the PWM inverter circuit 4 are set at the same phase {cf. (A) (B) in FIG. 13}.

FIG. 14 is a diagram showing voltage waveforms and a magnetic flux waveform in the case where the switching frequency of the PWM rectifying circuit 2 by the PWM rectifying circuit control part 6 is set at three times the switching frequency of the PWM inverter 4 by the PWM inverter control part 7, and the common mode voltage Vrec generated by the PWM rectifying circuit 2 and the common mode voltage Vinv generated by the PWM inverter 4 are set at opposite phases.

As understood from comparison between FIGS. 13 and 14, the peak of the magnetic flux $\phi$cc of the common mode choke coil Lc1 can be suppressed by setting the common mode voltage Vrec generated by the PWM rectifying circuit 2 and the common mode voltage Vinv generated by the PWM inverter 4 at the same phase.

Further, the noise terminal voltage is as shown in FIG. 15, which could be significantly reduced as compared to the noise terminal voltage shown in FIG. 11.

Therefore, magnetic saturation of the common mode choke coil Lc1 can be prevented, and size reduction and cost reduction of the common mode filter can be achieved.

Further, in stead of or in addition to setting the switching frequency of the PWM rectifying circuit 2 by the PWM rectifying circuit control part 6 at three times the switching frequency of the PWM inverter 4 by the PWM inverter control part 7, the resonance frequency of the common mode filter can be set at twice the switching frequency of the PWM rectifying circuit 2 or more.

In this case, magnetic saturation of the common mode choke coil Lc1 can also be prevented, and size reduction and cost reduction of the common mode choke coil Lc1 can also be achieved.

Further description will be made.

Since the common mode filter has a smaller impedance near the resonance frequency, a voltage applied to the common mode choke coil Lc1 increases to an extreme when the switching frequency of either the PWM rectifying circuit 2 or PWM inverter 4 becomes close to the resonance frequency of the common mode filter, so that the common mode choke coil Lc1 are more likely to bring about magnetic saturation, however, as described above, the common mode choke coil Lc1 can be prevented from bringing about magnetic saturation by setting the resonance frequency of the common mode filter at twice the carrier frequency of either the PWM rectifying circuit 2 or carrier frequency of the PWM inverter 4 or more.

FIGS. 16 to 19 show the common mode voltage Vcc {cf. (A)} as a whole, voltage VLC1 {cf. (B)} of the common mode choke coil Lc1 and magnetic flux $\phi$Lc1 {cf. (C)} of the common mode choke coil Lc1 in the case where the resonance frequency fc of the common mode filter is equal to, twice, three times and four times the switching frequency frec of the PWM rectifying circuit 2, respectively.

As understood from reference of FIGS. 16 to 19, the magnetic flux $\phi$Lc1 of the common mode choke coil Lc1 can be reduced by setting the resonance frequency fc of the common mode filter at twice the switching frequency frec of the PWM rectifying circuit 2 or more, which in turn can prevent the common mode choke coil Lc1 from bringing about magnetic saturation.

Further, in this embodiment, a diode rectifying circuit may be employed instead of the PWM rectifying circuit 2. In this case, however, the resonance frequency fc of the common mode filter is set at twice the switching frequency finv of the PWM inverter 4 or more.

In this case, magnetic saturation of the common mode choke coil Lc1 can also be prevented.

FIGS. 20 to 23 show the common mode voltage Vcc {cf. (A)} as a whole, voltage VLC1. {cf. (B)} of the common mode choke coil Lc1 and magnetic flux $\phi$Lc1 {cf. (C)} of the common mode choke coil Lc1 in the case where the resonance frequency fc of the common mode filter is equal to, twice, three times and four times the switching frequency finv of the PWM inverter 4, respectively.

As understood from reference of FIGS. 20 to 23, the magnetic flux $\phi$Lc1 of the common mode choke coil Lc1 can be reduced by setting the resonance frequency fc at twice the switching frequency finv of the PWM inverter 4 or more, which in turn can prevent the common mode choke coil Lc1 from bringing about magnetic saturation.

BRIEF DESCRIPTION OF DRAWINGS

FIG. 2 is a diagram for explaining generation of a common mode voltage waveform.

FIG. 3 is a diagram showing an equivalent circuit to a common mode.

FIG. 4 is a diagram showing a carrier wave, each phase voltage, a common mode voltage Vinv and a flux linkage $\phi$inv of a common mode choke coil when the modulation factor is either 1 or 0.

FIG. 13 is a diagram showing a common mode voltage waveform and a flux linkage of a common mode choke coil in the case where the switching frequency of the PWM rectifying circuit 2 by the PWM rectifying circuit control part 6 is set at three times the switching frequency of the PWM inverter 4 by the PWM inverter control part 7, and the common mode voltage Vrec generated by the PWM rectifying circuit 2 and the common mode voltage Vinv generated by the PWM inverter 4 are set at the same phase.

FIG. 14 is a diagram showing a common mode voltage waveform and a flux linkage of the common mode choke coil in the case where the switching frequency of the PWM rectifying circuit 2 by the PWM rectifying circuit control part 6 is set at three times the switching frequency of the PWM inverter 4 by the PWM inverter control part 7, and the common mode voltage Vrec generated by the PWM rectifying circuit 2 and the common mode voltage Vinv generated by the PWM inverter circuit 4 are set at opposite phases.

FIG. 15 is a diagram showing a noise terminal voltage in the case where the switching frequency of the PWM rectifying circuit 2 by the PWM rectifying circuit control part 6 is set at three times the switching frequency of the PWM inverter 4 by the PWM inverter control part 7.

FIG. 16 is a diagram showing a common mode voltage waveform and a flux linkage of the common mode choke coil in the case where the resonance frequency of the common mode filter is set equal to the switching frequency of the PWM rectifying circuit 2.

FIG. 17 is a diagram showing a common mode voltage waveform and a flux linkage of the common mode choke coil in the case where the resonance frequency of the common mode filter is set at twice the switching frequency of the PWM rectifying circuit 2.

FIG. 18 is a diagram showing a common mode voltage waveform and a flux linkage of the common mode choke coil in the case where the resonance frequency of the common mode filter is set at three times the switching frequency of the PWM rectifying circuit 2.

FIG. 19 is a diagram showing a common mode voltage waveform and a flux linkage of the common mode choke coil in the case where the resonance frequency of the common mode filter is set at four times the switching frequency of the PWM rectifying circuit 2.

FIG. 20 is a diagram showing a common mode voltage waveform and a flux linkage of the common mode choke coil in the case where a diode rectifying circuit is employed instead of the PWM rectifying circuit and the resonance frequency of the common mode filter is set equal to the switching frequency of the PWM inverter 4.

FIG. 21 is a diagram showing a common mode voltage waveform and a flux linkage of the common mode choke coil in the case where a diode rectifying circuit is employed instead of the PWM rectifying circuit and the resonance frequency of the common mode filter is set at twice the switching frequency of the PWM inverter 4.

FIG. 22 is a diagram showing a common mode voltage waveform and a flux linkage of a common mode choke coil in the case where a diode rectifying circuit is employed instead of the PWM rectifying circuit and the resonance frequency of the common mode filter is set at three times the switching frequency of the PWM inverter 4.

FIG. 23 is a diagram showing a common mode voltage waveform and a flux linkage of the common mode choke coil in the case where a diode rectifying circuit is employed instead of the PWM rectifying circuit and the resonance frequency of the common mode filter is set at four times the switching frequency of the PWM inverter 4.

EXPLANATION OF REFERENCE NUMERALS

Figure 1:
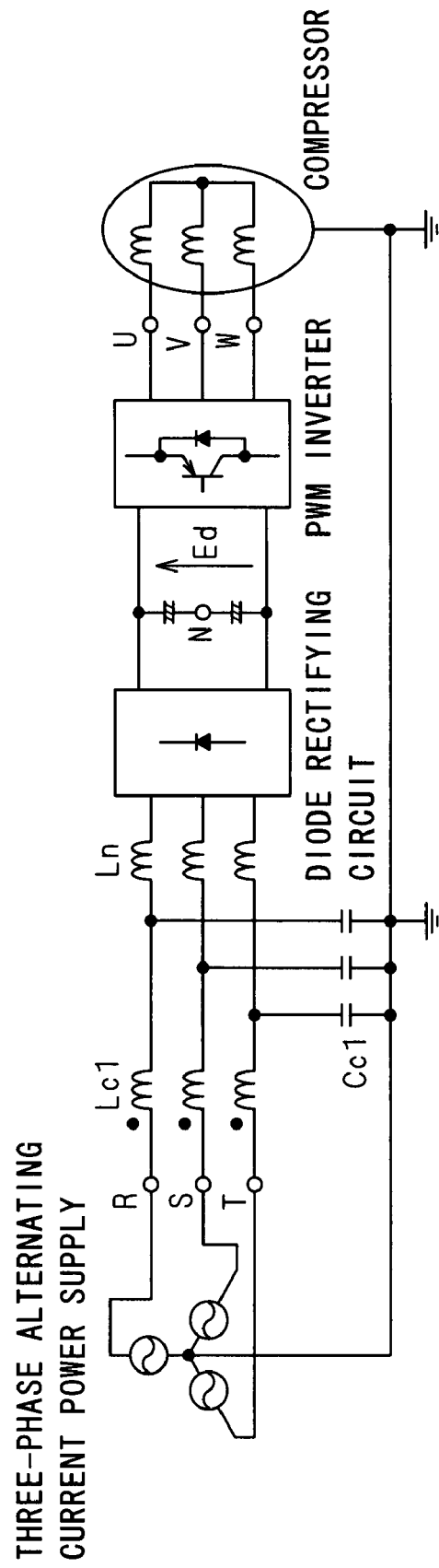
FIG. 1 is a schematic diagram showing the configuration of a compressor motor driving system into which an example of a conventional power converter is incorporated.
Figure 5:
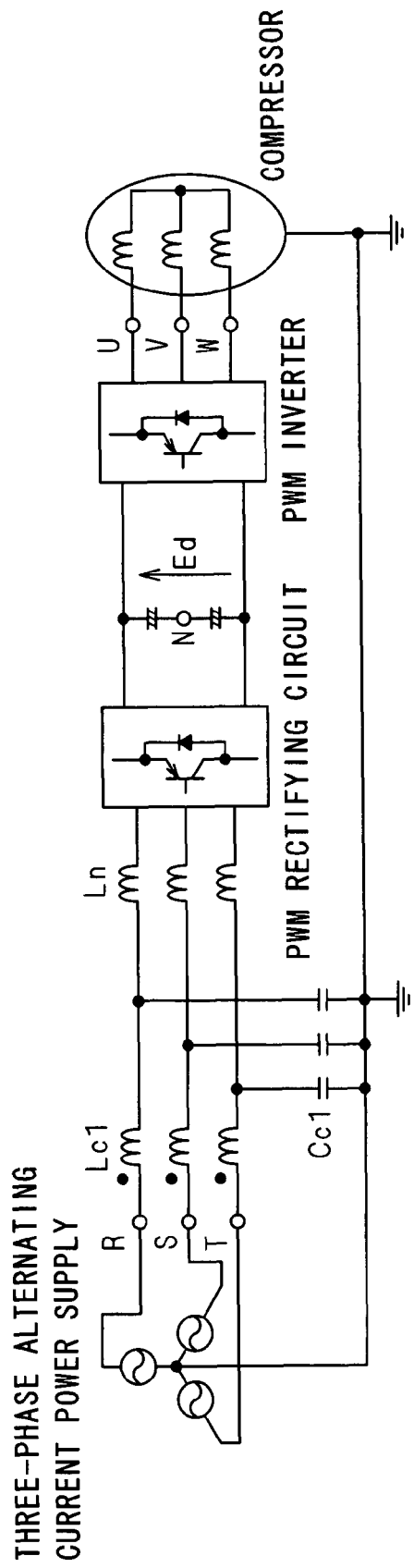
FIG. 5 is a schematic diagram showing the configuration of a compressor motor driving system into which another example of a conventional power converter is incorporated.
Figure 6:
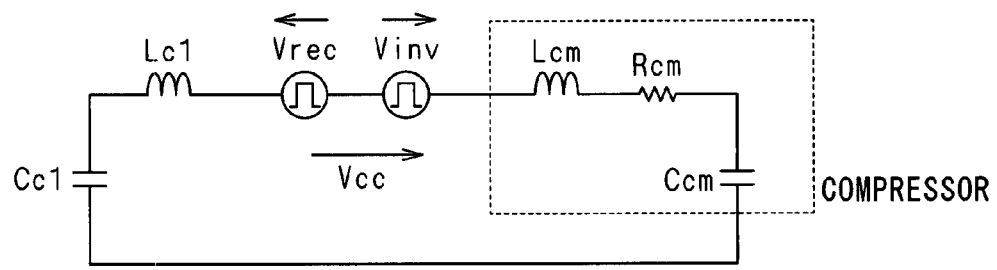
FIG. 6 is a diagram showing an equivalent circuit to a common mode.
Figure 7:
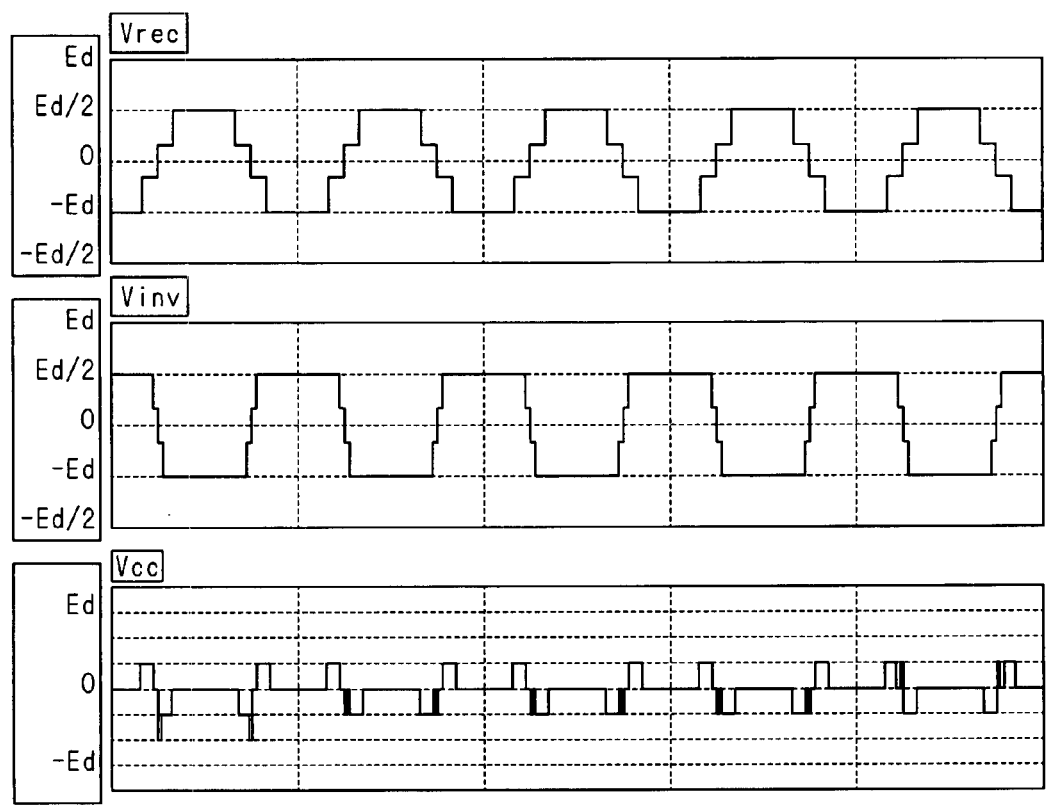
FIG. 7 is a diagram showing a common mode voltage waveform in the case where the switching frequency of a PWM rectifying circuit and the switching frequency of a PWM inverter are equal.
Figure 8:
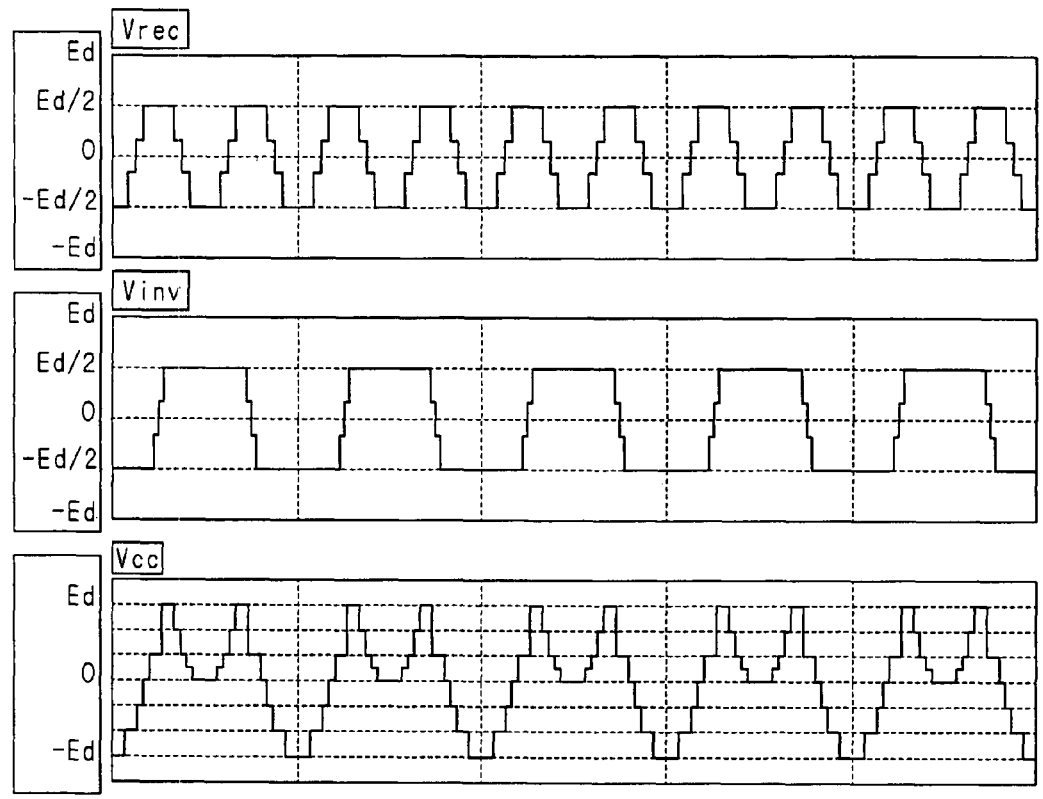
FIG. 8 is a diagram showing a common mode voltage waveform in the case where the switching frequency of the PWM rectifying circuit is set at twice the switching frequency of the PWM inverter.
Figure 9:
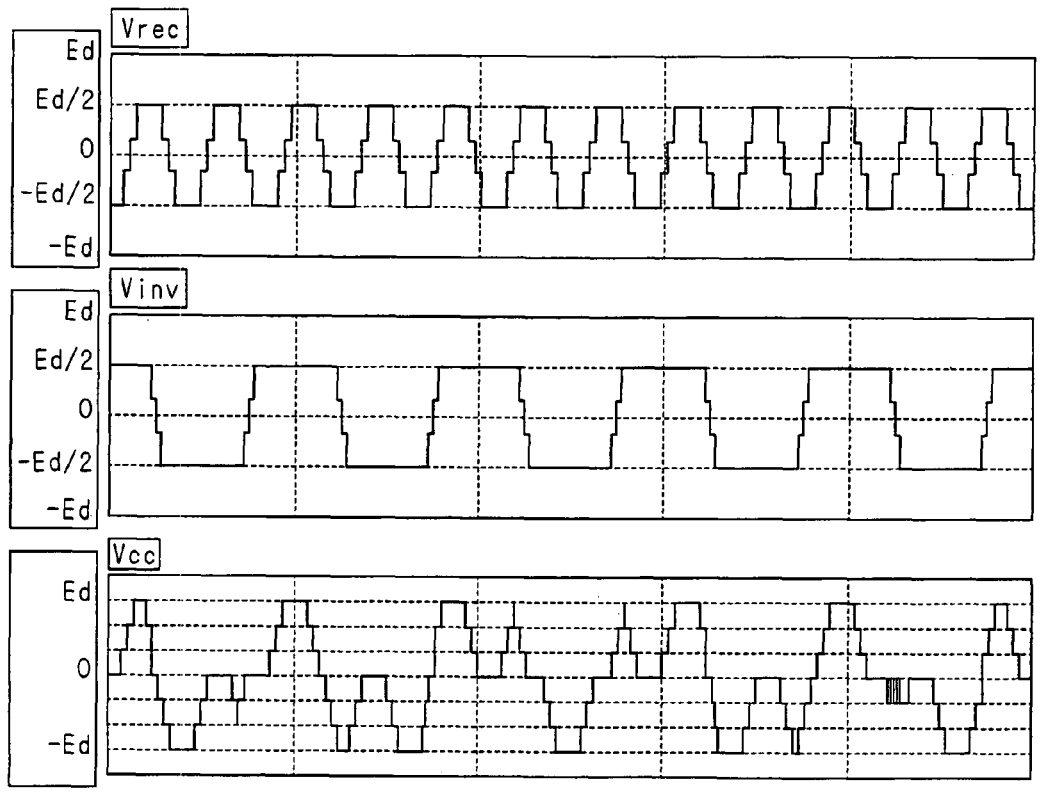
FIG. 9 is a diagram showing a common mode voltage waveform in the case where the switching frequency of the PWM rectifying circuit is set at 2.4 times the switching frequency of the PWM inverter.
Figure 10:
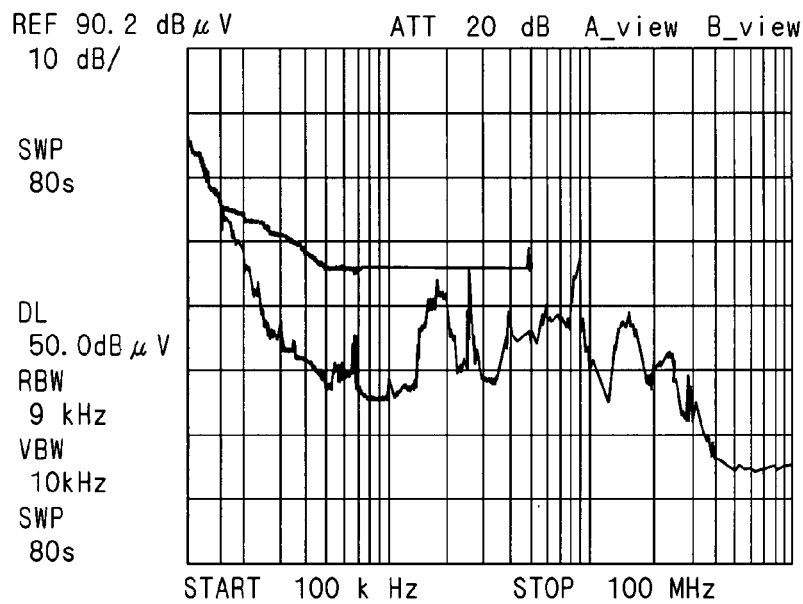
FIG. 10 is a diagram showing a noise terminal voltage in the case where the switching frequency of the PWM rectifying circuit and the switching frequency of the PWM inverter are equal.
Figure 11:
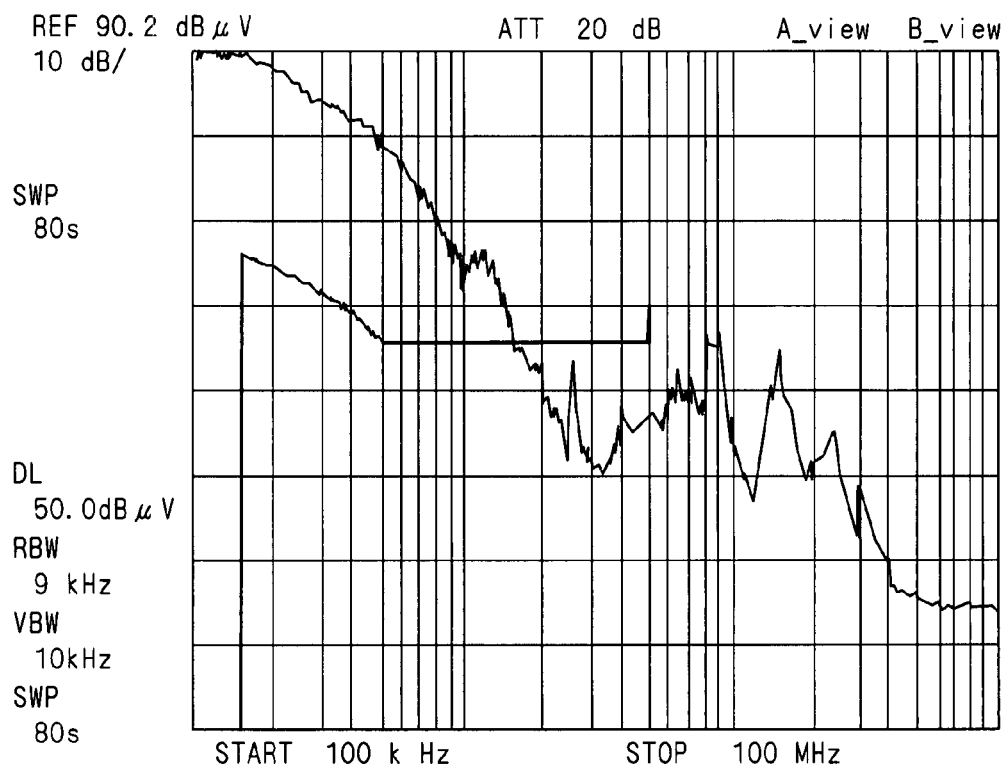
FIG. 11 is a diagram showing a noise terminal voltage in the case where the switching frequency of the PWM rectifying circuit is twice the switching frequency of the PWM inverter.
Figure 12:
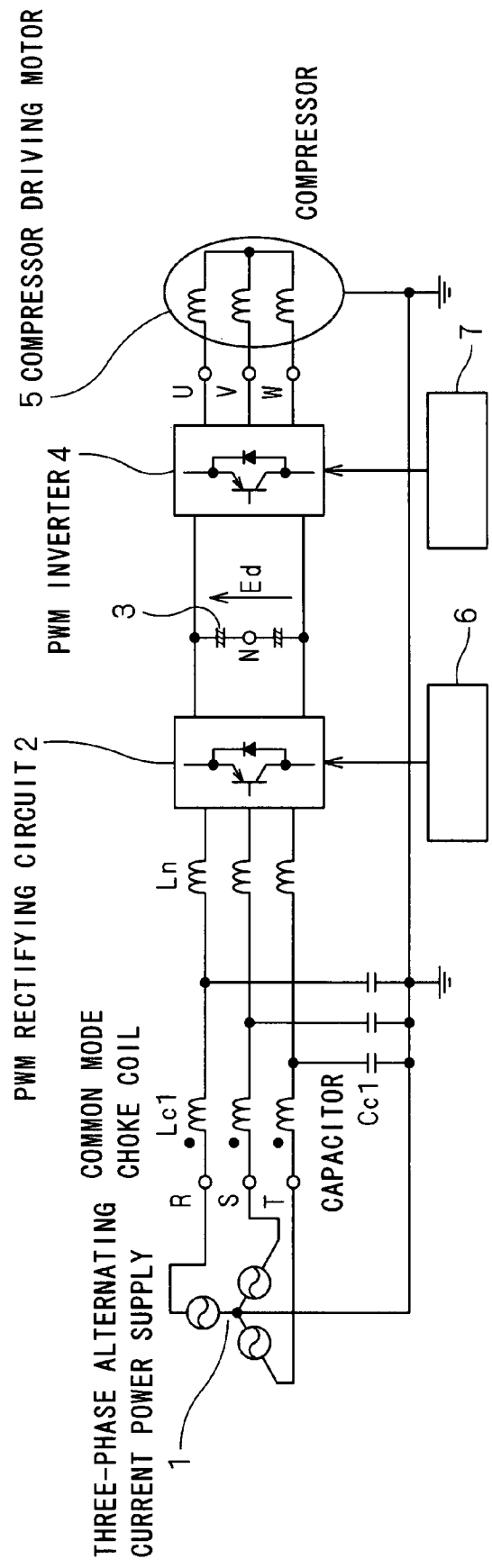
FIG. 12 is a schematic diagram showing the configuration of a compressor motor driving system into which an embodiment of a power converter of this invention is incorporated.

2 PWM rectifying circuit
4 PWM inverter
5 compressor driving motor
Lc1 common mode choke coil
Cc1 capacitor

The invention claimed is:

1. A power converter comprising:
    a common mode filter including a common mode choke coil and a capacitor;
    a PWM rectifying circuit having its input connected to said common mode filter, and operating at a first carrier frequency; and
    a PWM inverter circuit having its input connected to an output of said PWM rectifying circuit, and operating at a second carrier frequency, a relation between said first and said second carrier frequencies set so that said common mode choke coil does not bring about magnetic saturation.

2. The power converter according to claim 1, wherein said first carrier frequency is set to a value different from said second carrier frequency.

3. The power converter according to claim 1, wherein said PWM inverter circuit supplies a driving power to a compressor driving motor.

4. The power converter according to claim 2, wherein said PWM inverter circuit supplies a driving power to a compressor driving motor.

5. A power converter comprising:
    a common mode filter including a common mode choke coil and a capacitor;
    a rectifying circuit having its input connected to said common mode filter; and
    a PWM inverter circuit having its input connected to an output of said rectifying circuit, and operating at a carrier frequency of not more than half of a resonance frequency of said common mode filter.

6. The power converter according to claim 5, wherein said PWM inverter circuit supplies a driving power to a compressor driving motor.

7. A power converter comprising:
    a common mode filter including a common mode choke coil and a capacitor;
    a rectifying circuit having its input connected to said common mode filter, and operating at a carrier frequency of not more than half of a resonance frequency of said common mode filter; and
    a PWM inverter circuit having its input connected to an output of said rectifying circuit.

8. The power converter according to claim 7, wherein said PWM inverter circuit supplies a driving power to a compressor driving motor.

9. The power converter according to claim 1, wherein
    a carrier frequency of said PWM rectifying circuit is set at an odd-multiple being more than three of a carrier frequency of said PWM inverter circuit, and
    a common mode voltage generated by said PWM rectifying circuit and a common mode voltage generated by said PWM inverter circuit are set at the same phase to each other.

10. A power converter comprising:
    a common mode filter including a common mode choke coil and a capacitor;
    a PWM rectifying circuit having its input connect to said common mode filter, and operating at a first carrier frequency; and a PWM inverter circuit having its input connected to an output of said PWM rectifying circuit, and operating at a second carrier frequency, a carrier frequency of said PWM rectifying circuit set at an odd-multiple being more than three of a carrier frequency of said PWM inverter circuit, and a common mode voltage generated by said PWM rectifying circuit and a common mode voltage generated by said PWM inverter circuit set at the same phase to each other.

* * * * *